(12) United States Patent
Wilton et al.

(10) Patent No.: US 6,877,576 B2
(45) Date of Patent: *Apr. 12, 2005

(54) METHOD AND APPARATUS FOR SELECTIVE OPERATION OF A HYBRID ELECTRIC VEHICLE POWERPLANT

(75) Inventors: Thomas F. Wilton, Aurora, CO (US); Joshua J. Anderson, Edgewater, CO (US); Robert W. Schmitz, Littleton, CO (US)

(73) Assignee: Transportation Techniques, LLC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/621,606

(22) Filed: Jul. 18, 2003

(65) Prior Publication Data

US 2004/0026142 A1 Feb. 12, 2004

Related U.S. Application Data

(63) Continuation of application No. 09/764,448, filed on Jan. 19, 2001, now Pat. No. 6,622,804.

(51) Int. Cl.[7] ................................ B60K 6/00
(52) U.S. Cl. .................................... 180/65.2
(58) Field of Search ............... 180/65.1–65.4; 701/22; 318/375, 376; 290/40

(56) References Cited

U.S. PATENT DOCUMENTS

| | | | |
|---|---|---|---|
| 4,021,677 A | * | 5/1977 | Rosen et al. ............ 290/40 R |
| 4,187,436 A | | 2/1980 | Etienne |
| 4,940,114 A | | 7/1990 | Albrecht |
| 5,285,862 A | | 2/1994 | Furutani et al. |
| 5,291,960 A | | 3/1994 | Brandenburg et al. |
| 5,307,644 A | | 5/1994 | Cummins et al. |
| 5,318,142 A | | 6/1994 | Bates et al. |
| 5,345,155 A | | 9/1994 | Masaki et al. |
| 5,481,460 A | | 1/1996 | Masaki et al. |
| 5,512,022 A | | 4/1996 | Suzuki |
| 5,589,743 A | | 12/1996 | King |
| 5,629,586 A | | 5/1997 | Yasuda et al. |
| 5,629,596 A | | 5/1997 | Iijima et al. |
| 5,642,270 A | | 6/1997 | Green et al. |
| 5,650,713 A | | 7/1997 | Takeuchi et al. |
| 5,704,440 A | | 1/1998 | Urban et al. |
| 5,726,541 A | | 3/1998 | Glenn et al. |
| 5,739,664 A | | 4/1998 | Deng et al. |
| 5,785,138 A | | 7/1998 | Yoshida |
| 5,786,640 A | | 7/1998 | Sakai et al. |

(Continued)

FOREIGN PATENT DOCUMENTS

| | | |
|---|---|---|
| DE | 197 22 175 A1 | 12/1997 |
| EP | 0 177 770 A1 | 4/1986 |
| EP | 0 496 059 A1 | 7/1992 |
| EP | 0 510 582 A2 | 10/1992 |
| EP | 0 906 847 A2 | 4/1999 |
| EP | 0 925 988 A2 | 6/1999 |
| JP | 05-286368 A | 11/1993 |
| JP | A-7-75210 | 3/1995 |
| WO | WO 94/07301 | 3/1994 |
| WO | WO 98/01941 | 1/1998 |
| WO | WO 00 21770 A | 4/2000 |

Primary Examiner—Lesley D. Morris
Assistant Examiner—Paul Royal, Jr.
(74) Attorney, Agent, or Firm—Oliff & Berridge, PLC

(57) ABSTRACT

A series type hybrid electric vehicle that controls an internal combustion engine, generator, and electric motor for reducing the load applied to the internal combustion engine when the internal combustion engine is restarted, lowers the thermal stresses to the internal combustion engine when the engine is turned off and is able to remove excess fuel when turning off the internal combustion engine.

34 Claims, 10 Drawing Sheets

U.S. PATENT DOCUMENTS

| | | | |
|---|---|---|---|
| 5,804,935 A | 9/1998 | Radev | |
| 5,878,830 A | 3/1999 | Ruppert et al. | |
| 5,898,282 A | 4/1999 | Drozdz et al. | |
| 5,905,349 A | 5/1999 | Farkas et al. | |
| 5,915,488 A | 6/1999 | Fliege | |
| 5,924,395 A | 7/1999 | Moriya et al. | |
| 5,924,504 A | 7/1999 | Ruppert, Jr. et al. | |
| 5,993,169 A | 11/1999 | Adachi et al. | |
| 6,018,198 A | 1/2000 | Tsuzuki et al. | |
| 6,026,921 A | 2/2000 | Aoyama et al. | |
| 6,073,712 A | 6/2000 | Buglione | |
| 6,116,363 A | 9/2000 | Frank | |
| 6,122,587 A | 9/2000 | Takahara et al. | |
| 6,127,813 A | 10/2000 | Tamagawa | |
| 6,142,757 A | 11/2000 | Borchert | |
| 6,242,873 B1 | 6/2001 | Drozdz et al. | |
| 6,314,346 B1 | 11/2001 | Kitajima et al. | |
| 6,333,612 B1 | 12/2001 | Suzuki et al. | |
| 6,333,620 B1 * | 12/2001 | Schmitz et al. | 320/132 |
| 6,334,079 B1 | 12/2001 | Matsubara et al. | |
| 6,341,584 B1 | 1/2002 | Itoyama et al. | |
| 6,346,062 B1 | 2/2002 | Shimabukuro et al. | |
| 6,356,817 B1 | 3/2002 | Abe | |
| 6,367,570 B1 | 4/2002 | Long et al. | |
| 6,386,170 B1 | 5/2002 | Iwano et al. | |
| 6,405,818 B1 | 6/2002 | Anthony et al. | |
| 6,424,115 B1 | 7/2002 | Holl et al. | |
| 6,441,574 B1 | 8/2002 | Phillips et al. | |
| 6,449,537 B1 | 9/2002 | Phillips et al. | |
| 6,480,767 B1 | 11/2002 | Yamaguchi et al. | |
| 6,483,198 B1 * | 11/2002 | Schmitz et al. | 290/40 C |
| 6,532,926 B1 | 3/2003 | Kuroda et al. | |
| 6,543,565 B1 | 4/2003 | Phillips et al. | |
| 6,550,557 B1 | 4/2003 | Wakashiro et al. | |
| 6,573,675 B1 * | 6/2003 | Schmitz et al. | 318/434 |
| 6,622,804 B1 * | 9/2003 | Schmitz et al. | 180/65.2 |

* cited by examiner

METHOD AND APPARATUS FOR SELECTIVE OPERATION OF A HYBRID ELECTRIC VEHICLE POWERPLANT

This is a Continuation of application Ser. No. 09/764,448 filed Jan. 19, 2001 now U.S. Pat. No. 6,622,804. The entire disclosure of the prior application is hereby incorporated by reference herein in its entirety.

BACKGROUND OF THE INVENTION

1. Field of Invention

The invention relates to methods and apparatus for adaptably controlling the series hybrid electric vehicle.

2. Description of Related Art

The desire for cleaner air has caused various federal, state, and local governments to change their regulations to require lower vehicle emissions. Increasing urban traffic congestion has prompted a need for increases in public mass transit services. Many large cities use buses to transport people into, out of, and within traffic congested urban areas. Conventional buses use diesel powered internal combustion engines. Diesel engines produce emissions, including carbon monoxide, that contribute to air pollution. It is possible to refine cleaner diesel fuel. However, cleaner diesel fuel is more costly to refine and causes a corresponding increase in the cost of bus service.

Alternative fuels have been used to reduce emissions and conserve oil resources. Compressed natural gas has been used as an alternative fuel. Compressed natural gas does not produce as much power in conventional internal combustion engines as gasoline and diesel and has not been widely developed or accepted as an alternative to gasoline and diesel.

Additives have also been developed for mixing with gasoline to reduce emissions. Ethanol and MTBE have been added to gasoline to oxygenate the combustion of gasoline and reduce emissions of carbon monoxide. These additives, however, are believed to cause decreased gas mileage and, in the case of MTBE, to be a potential public health threat.

Electric vehicles have been developed that produce zero emissions. Electric vehicles are propelled by an electric motor that is powered by a battery array on board the vehicle. The range of electric vehicles is limited as the size of the battery array which can be installed on the vehicle is limited. Recharging of the batteries can only be done by connecting the battery array to a power source. Electric vehicles are not truly zero emitters when the electricity to charge the battery array is produced by a power plant that burns, for example, coal.

Hybrid electric vehicles have also been developed to reduce emissions. Hybrid electric vehicles include an internal combustion engine and at least one electric motor powered by a battery array. In a parallel type hybrid electric vehicle, both the internal combustion engine and the electric motor are coupled to the drive train via mechanical means. The electric motor may be used to propel the vehicle at low speeds and to assist the internal combustion engine at higher speeds. The electric motor may also be driven, in part, by the internal combustion engine and be operated as a generator to recharge the battery array.

In a series type hybrid electric vehicle, the internal combustion engine is used only to run a generator that charges the battery array. There is no mechanical connection of the internal combustion engine to the vehicle drive train. The electric traction drive motor is powered by the battery array and is mechanically connected to the vehicle drive train.

In present series type hybrid electric vehicles, there is a need to control the engine, generator and electric motor according to the emission environment. In one emission environment, the engine is running at a selected operating speed. However, in a second emission environment, the engine is turned off. There is thus a need to control this engine, generator and electric motor to reduce engine wear during engine start up as the engine operates in the various operating modes. There is also a need to control the engine, generator and electric motor to reduce engine wear of the engine and to remove excess fuel during engine shut off.

SUMMARY OF THE INVENTION

The invention provides methods and apparatus for adaptively managing the internal combustion engine, generator, and electric motor for a series type hybrid electric vehicle.

An exemplary embodiment of a series type hybrid electric vehicle according to the invention is controlled so that a generator set of the vehicle, including an internal combustion engine connected to a generator, reduces the load applied to the internal combustion engine when the internal combustion engine is restarted, lowers the thermal stresses to the internal combustion engine when the engine is turned off and is able to remove excess fuel when turning off the internal combustion engine.

According to an exemplary embodiment, a method for adaptively controlling the state of charge of a battery array of a series type hybrid electric vehicle having an internal combustion engine connected to a generator and at least one electric motor with the internal combustion engine and generator selectively operated in various operation modes consisting of operating the vehicle in a first mode in which the internal combustion engine and generator are off and the motor propels the vehicle from power stored in the battery array, operating the vehicle in a second mode in which the internal combustion engine and generator are operating without restriction, and operating the vehicle in a third mode in which the operation of the internal combustion engine and generator are at least partially restricted to limit vehicle discharges.

According to another exemplary embodiment, a series type hybrid electric vehicle includes an internal combustion engine connected to a generator, a battery array receiving current at least from the generator, at least one electric motor receiving current from the battery array, and a controller that selectively operates the engine and generator in various operating modes, including a first mode in which the internal combustion engine and generator are off and the motor propels the vehicle from power stored in the battery array, a second mode in which the internal combustion engine and generator are operating without restriction, and a third mode in which the operation of the internal combustion engine and generator are at least partially restricted to limit vehicle discharges.

Other features of the invention will become apparent as the following description proceeds and upon reference to the drawings.

BRIEF DESCRIPTION OF THE DRAWINGS

Various exemplary embodiments of this invention will be described in detail with reference to the following figures, wherein like numerals reference like elements, and wherein.

DETAILED DESCRIPTION OF PREFERRED EMBODIMENTS

Figure 1:
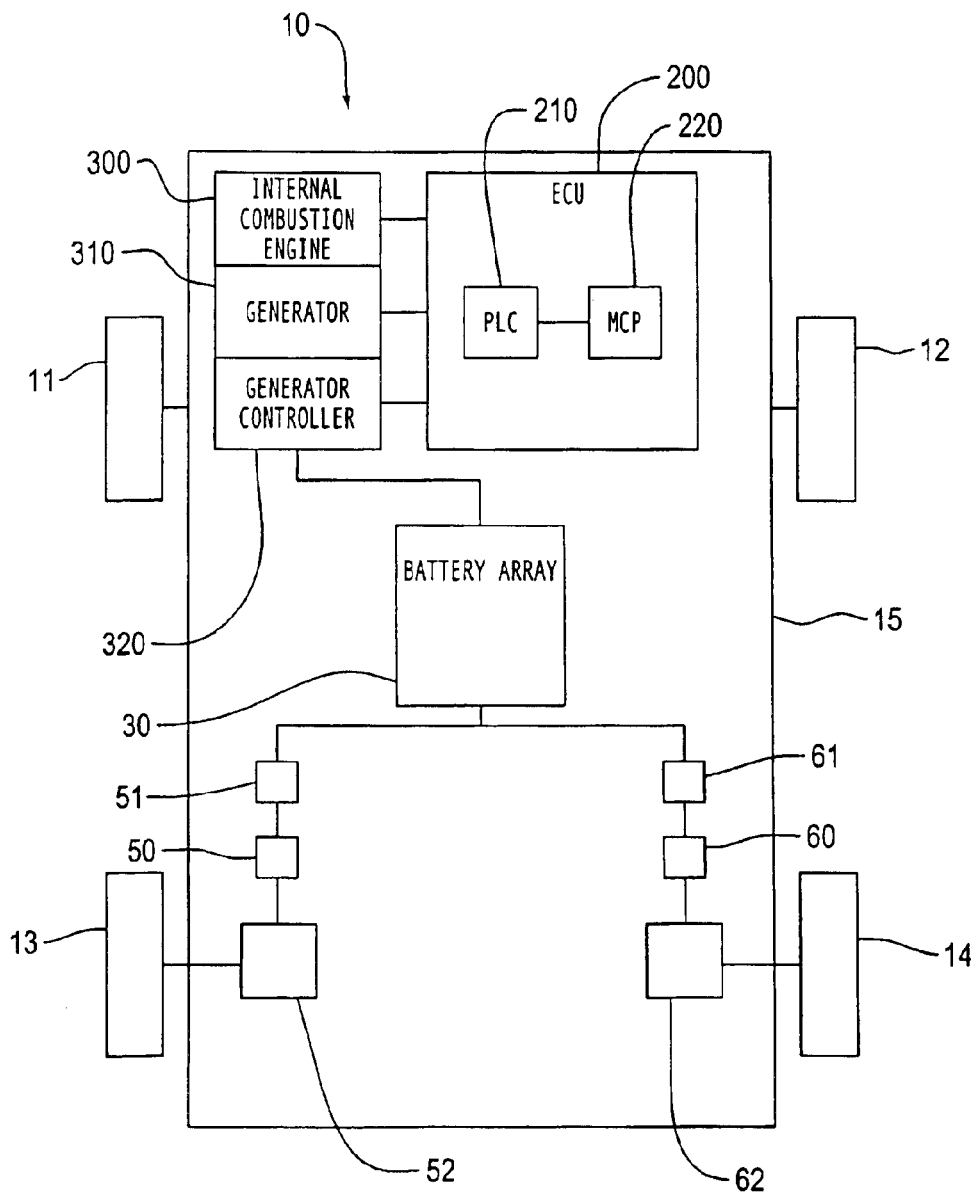
FIG. 1 is schematic view of an exemplary embodiment of a series hybrid electric vehicle according to the invention.

Referring to FIG. 1, an exemplary embodiment of a series type hybrid electric vehicle 10 according to the invention includes a plurality of wheels 11, 12, 13, and 14 and a vehicle chassis 15. The wheels 13 and 14 are coupled to electric motors 50 and 60, respectively, through gear boxes 52 and 62, respectively. The wheels 13 and 14 are independently mounted to respective suspension components, such as swing arms. In this embodiment, the wheels 13 and 14 are not coupled together by an axle. In other embodiments, the wheels 13 and 14 may be coupled together, for example, by an axle. The wheels 13 and 14 may be either the front wheels or the rear wheels of the vehicle 10. In this embodiment, the wheels 11 and 12 are not driven and may be coupled together by an axle. In other embodiments, the wheels 11 and 12 may also be driven.

In an exemplary embodiment of the vehicle according to the invention, the vehicle 10 is a bus having an occupancy capacity in excess of 100. However, it should be appreciated that the vehicle may be a bus of a smaller capacity or that the vehicle may be a smaller passenger vehicle, such as a sedan. In various exemplary embodiments, the vehicle may be any size and form currently used or later developed.

The electric motors 50 and 60 are powered by a battery array 30 and are controlled by motor controllers 51 and 61, respectively. According to an exemplary embodiment of the vehicle 10, the electric motors 50 and 60 are synchronous, permanent magnet DC brushless motors. Each electric motor 50 and 60 is rated for 220 Hp and 0–11,000 rpm. The maximum combined power output of the electric motors 50 and 60 is thus 440 Hp. The permanent magnet DC brushless motors include permanent magnets, such as rare earth magnets, for providing a magnetic field as opposed to AC induction motors which create or induce a magnetic field on the rotating portion of the motor. The DC brushless motors are thus inherently more efficient than AC induction motors as no losses occur from inducing the magnetic field. The DC brushless motors also have a more useful torque profile, a smaller form factor, and lower weight than AC induction motors. The DC brushless motors also require less energy input for an equivalent power output than AC induction motors. However, this invention is not limited to permanent magnet DC brushless motors, and other types of electric motors, such as AC induction motors, can be used.

The series type hybrid electric vehicle 10 also includes a generator set (genset) 300, 310 including an internal combustion engine 300 and a generator 310 that is driven by the internal combustion engine 300. The internal combustion engine 300 may be powered by gasoline, diesel, or compressed natural gas. It should be appreciated, however, that the internal combustion engine 300 may be replaced by a fuel cell, turbine or any other number of alternatives for creating usable electric power. According to an exemplary embodiment of the invention, the internal combustion engine 300 may be a 2.5 liter Ford LRG-425 engine powered by compressed natural gas. The engine 300 is operated to produce 70 Hp. It should be appreciated that the power of the engine 300 may be increased by increasing the RPM of the engine 300 and decreased by decreasing the RPM of the engine 300. In this embodiment with two 220 Hp electric motors 50 and 60 and an internal combustion engine 300 operating at 70 Hp, the performance enhancement factor of the vehicle 10 is 440/70, or at least 6.2. Other internal combustion engines can of course be utilized.

The generator 310 is a DC brushless generator that produces, for example, 240–400 $V_{AC}$. In an exemplary embodiment of the vehicle 10, the generator is operated to produce 345 $V_{AC}$ during certain drive modes. An output shaft of the internal combustion engine 300 is connected to the generator 310 and the AC voltage of the generator 310 is converted to a DC voltage by a generator controller 320. The converted DC voltage charges the battery array 30. The battery array may include, for example, 26 deep cycle, lead-acid batteries of 12 volts each connected in series. It should be appreciated, however, that other batteries, such as nickel cadmium, metal hydride or lithium ion, may be used and that any number of batteries can be employed, as space permits. Depending upon the load on the vehicle 10, the battery array voltage ranges between 240 and 400 $V_{DC}$.

An electronic control unit (ECU) 200 includes a programmable logic controller (PLC) 210 and a master control panel (MCP) 220. The MCP 220 receives input from various sensors and provides the connection to outputs in the vehicle 10 regarding the information received from the sensors. Some or all of the information is provided to the PLC 210. The PLC 210 executes various programs to control, for example, the internal combustion engine 300, the generator 310, the generator controller 320, the electric motors 50 and 60, and the motor controllers 51 and 61, based in part on information received from the MCP 220.

Although not shown in the drawings, the vehicle 10 includes a cooling system or cooling systems for the internal combustion engine 300, the generator controller 320, the battery array 30, and the motor controllers 51 and 61. The cooling system may be a single system which includes a coolant reservoir, a pump for pumping the coolant through a heat exchanger such as a radiator and a fan for moving air across the heat exchanger or a plurality of cooling systems similarly constructed. The ECU 200 controls the cooling systems, including the pumps and the fans, to perform a heat shedding operation in which the heat generated by the engine 300, the controllers 320, 51, and 61, the battery array 30, and various other systems is released to the atmosphere. Any acceptable means and methods for cooling the vehicle components may be utilized.

Figure 2:
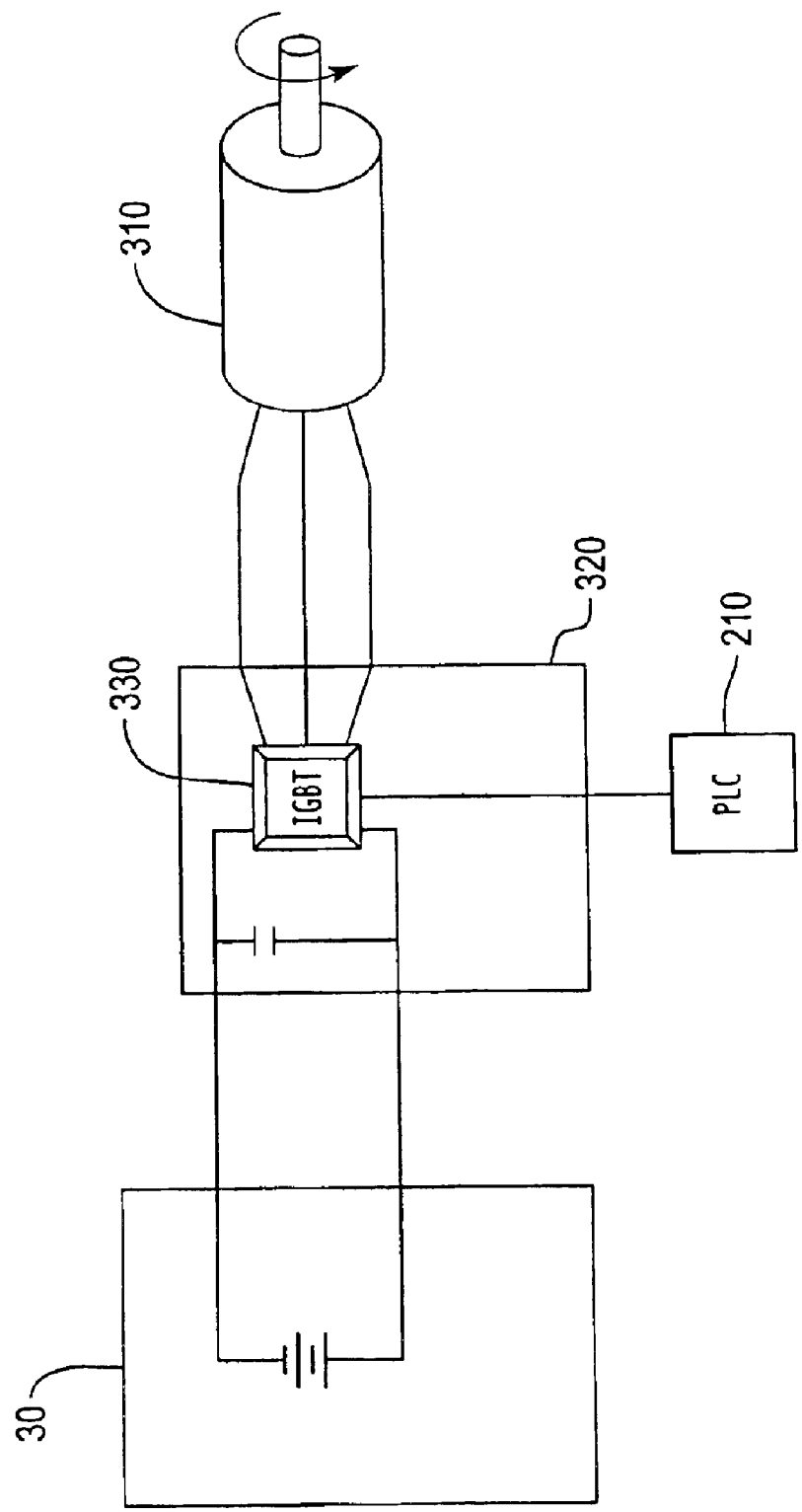
FIG. 2 is a schematic diagram illustrating an exemplary embodiment of a circuit for controlling charging of the battery array by the generator.

As shown in FIG. 2, the coils of the generator 310 are connected to the generator controller 320. The generator controller 320 includes two switching insulated or isolated gate bipolar transistors (IGBT) 330 per phase of the generator 310 and their corresponding diodes. In an exemplary embodiment including a three phase generator 310, the generator controller includes 6 IGBT 330. The PLC 210 controls each IGBT 330 of the generator controller 320 to control the conversion of the AC voltage of the generator 310 to the DC voltage for charging the battery array 30. The PLC 210 may switch the IGBT 330 off when the SOC of the battery array 30 reaches an upper control limit to stop the conversion of the AC voltage to DC voltage and prevent overcharging of the battery array 30.

According to an exemplary embodiment of the invention, the engine 300 runs continuously during operation of the vehicle 10 and continuously turns the shaft of the generator 310. The PLC 210 switches each IGBT 330 on and off via high speed pulse width modulation (PWM) to control charging of the battery array 30. It should be appreciated however that the PLC 210 may control the engine 300 by turning the engine 300 on and off to control charging of the battery array 30.

Figure 3:
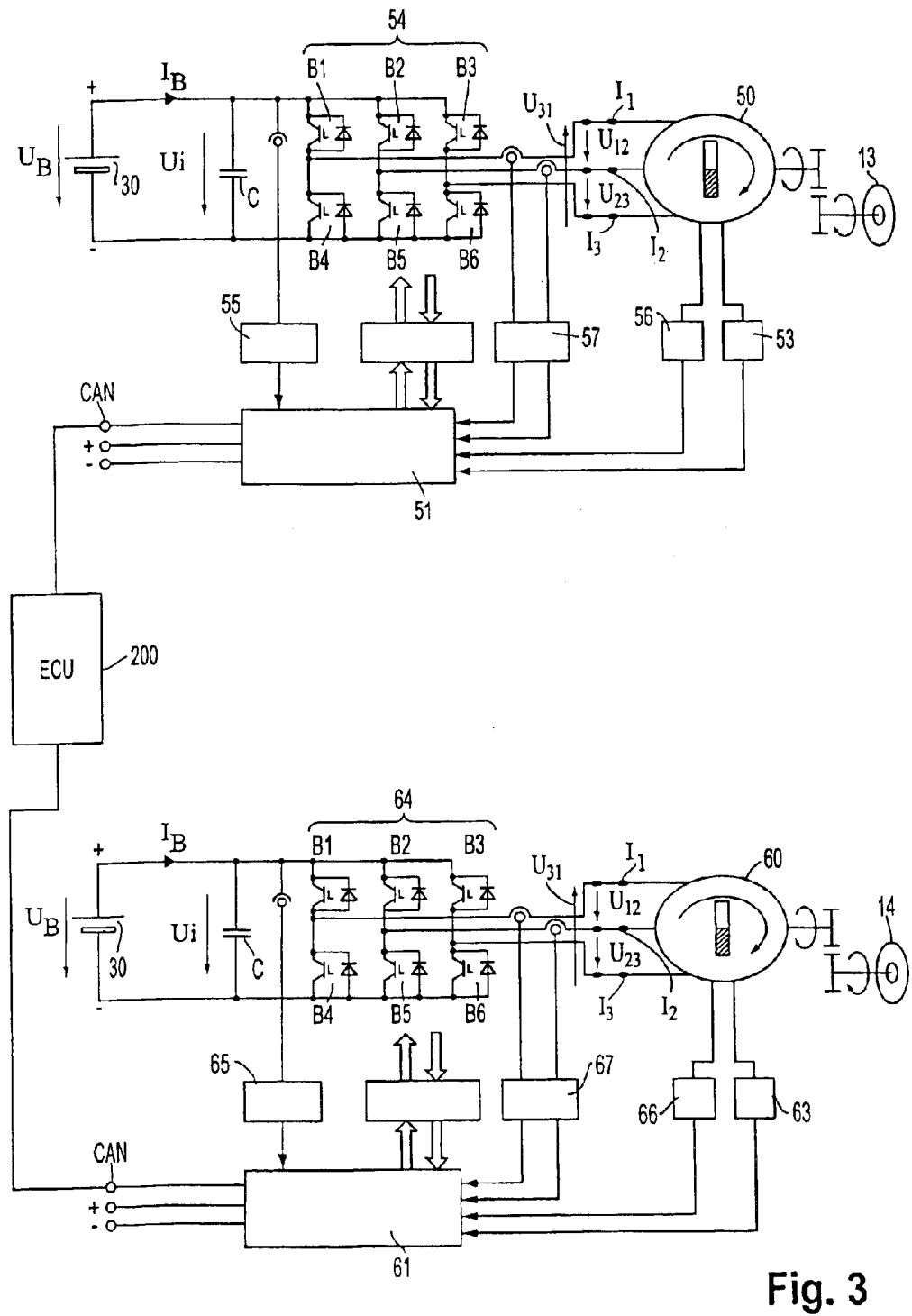
FIG. 3 is a diagram illustrating an exemplary embodiment of a circuit for controlling the electric motors.

Referring to FIG. 3, a control circuit for the electric motors 50 and 60 includes the motor controllers 51 and 61. The motor controllers 51 and 61 receive power from the battery array 30 and distribute the power to the electric motors 50 and 60 by switches B1–B6 of pulse width modulation (PWM) inverters 54 and 64. The PWM inverters 54 and 64 generate AC current from the DC battery array 30. The battery current $I_B$ is distributed by the switches B1–B6, for example IGBT, of the PWM inverters 54 and 64 into motor currents $I_1$, $I_2$, and $I_3$ for driving the motors 50 and 60. The motor controllers 51 and 61 distribute the battery current $I_B$ via the switches B1–B6 by factoring feedback from position sensors 53 and 63 and encoders 56 and 66 that determine the timing or pulsing of electromagnets of the motors 50 and 60. The pole position sensors 53 and 63 determine the pole positions of the permanent magnets of the motors 50 and 60 and the encoders 56 and 66 determine the phase angle. It should be appreciated that each pair of pole position sensors 53 and 63 and encoders 56 and 66, respectively, may be replaced by a phase position sensor and the phase change frequency may be read to determine the speed of rotation of the electric motors 50 and 60.

The motor controllers 51 and 61 calculate the motor connector voltages $U_{12}$, $U_{31}$, and $U_{23}$ based on the rotary velocity and the known flux value of the motors 50 and 60 between the motor connectors. The operation of the inverters 54 and 64 is then determined by the rectified voltages of the diodes of the switches B1–B6 or by the voltage Ui of an intermediate circuit including a capacitor C. If the voltage Ui becomes larger than the battery voltage $U_B$, uncontrolled current may flow to the battery array 30. Voltage sensors 55 and 65 determine the voltage Ui and the motor controllers 51 and 61 compare the voltage Ui to the battery voltage $U_B$. If Ui is greater than $U_B$, the motor controllers 51 and 61 activate the switches B1–B6 to cause magnetizing current to flow to the motors 50 and 60 to avoid unnecessary recharging of the battery array 30.

As shown in FIG. 3, each motor controller 51 and 61 receives control data from the ECU 200 through a controller area network (CAN). The ECU 200 can communicate with the various sensors and the motor controllers 51 and 61 by, for example, DeviceNet™, an open, global industry standard communication network.

Figure 4:
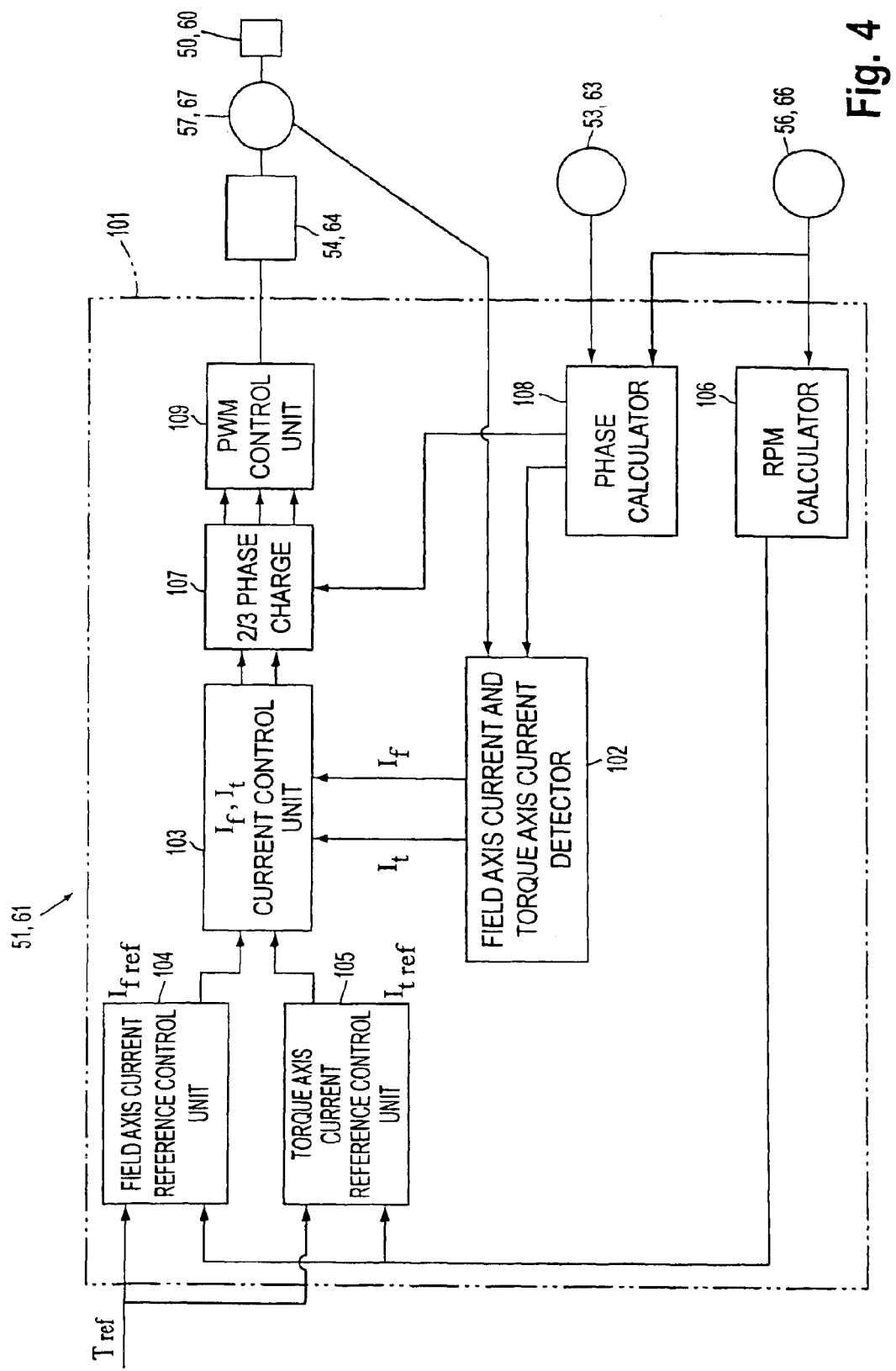
FIG. 4 is a diagram illustrating an exemplary embodiment of a circuit of the motor controllers.

Referring to FIG. 4, each motor controller 51 and 61 includes a control unit 101 which includes a field axis current and torque axis current detector 102, a field axis current and torque axis current control unit 103, a field axis current reference control unit 104, a torque axis current reference control unit 105, an rpm calculator 106, a 2/3 phase changer 107, a phase calculator 108 and a PWM control unit 109.

The detector 102 calculates the torque axis current $I_t$ and the field axis current $I_f$ by executing a 3-phase, 2-phase coordinate transfer from the input of (1) current detectors 57 and 67 that measure the 3-phase AC current of the motors 50 and 60 and (2) phase calculator 108 that receives input from the position sensors 53 and 63 and the encoders 56 and 66. The field axis current $I_f$ is a measure of the current used for winding the motor and the torque axis current $I_t$ is a measure of the back electric current in maintaining the synchronized rotation of the motors 50 and 60 when the rotation of the motors 50 and 60 is reduced.

The output of detector 102 goes to the field axis current and torque axis current control unit 103. The current control unit 103 also receives (1) a field axis current reference value $I_{fref}$ from the field axis current reference control unit 104 and (2) a torque axis current reference value $I_{tref}$ from the torque axis current reference control unit 105.

The reference control units 104 and 105 determine the current reference values $I_{fref}$ and $I_{tref}$ by comparing a torque reference value $T_{ref}$ (which is determined by the position of an accelerator pedal of the vehicle) with the actual rotational velocity determined by the rpm calculator 106 that receives input from the encoders 56 and 66.

The 2/3 phase changer 107 receives input from the current control unit 103 and the phase calculator 108, and calculates the 3-phase AC reference values by performing a 2-phase/3-phase coordinate transformation. The PWM control unit 109 generates a PWM signal by comparing the 3-phase reference values received from the 2/3 phase changer 107 with a triangular wave signal. The PWM control unit 109 communicates this PWM signal to the PWM inverters 54 and 64.

Figure 5:
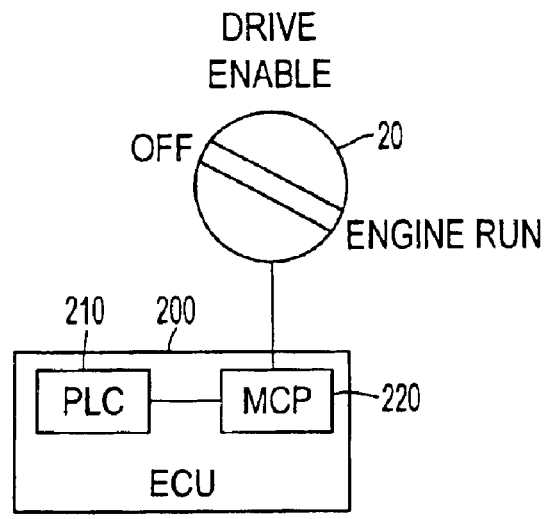
FIG. 5 is a diagram illustrating an exemplary embodiment of a master control switch.

Referring to FIG. 5, a master control switch 20 positioned, for example, in an operator area of the vehicle 10, includes an off position, a drive enable position and an engine run position. Any acceptable switch mechanism can be employed. The rotary switch 20 in FIG. 5 is merely an example of an acceptable switch. The position of the switch 20 is input to the MCP 220. When the switch 20 is moved to the drive enable position, the PLC 210 controls the electric motors 50 and 60 to run the vehicle in a driver selected zero emissions mode by drawing power from the battery array 30, i.e., the electric motors 50 and 60 are powered solely by the battery array 30. The genset 300, 310 is not operated during the zero emissions mode. The range of the vehicle 10 in zero emissions mode is limited as the state of charge (SOC), i.e., the amount of energy stored within a battery, of the battery array 30 will eventually be lowered below a level sufficient to drive the electric motors 50 and 60 to propel the vehicle.

When the switch 20 is moved to the engine run position, the ECU 200 instructs the generator 310 to operate as a motor for starting the engine 300. During the starting of the engine 300, the generator 310 receives current from the battery array 30. The current is supplied until the engine 300 reaches a predetermined idling speed and then the current supply is stopped. The engine 300 then drives the generator 310 to charge the battery array 30, as necessary. The ECU 200 controls the engine 300 by monitoring the engine speed (rpm) as sensed by a tachometer (not shown) and the fuel mixture as sensed by an oxygen sensor (not shown). The ECU 200 may, for example, control a fuel injection amount of the engine 300 and/or the position of a throttle valve of the engine 300. The ECU 200 may also monitor engine conditions such as the oil pressure and the coolant temperature as detected by sensors (not shown). An automatic zero emission mode is provided by the ECU 200 while in the engine run position when the SOC of the battery array 30 is sufficient or when the sensors of the vehicle 10 sense areas and routes where zero emission modes are required.

Figure 6:
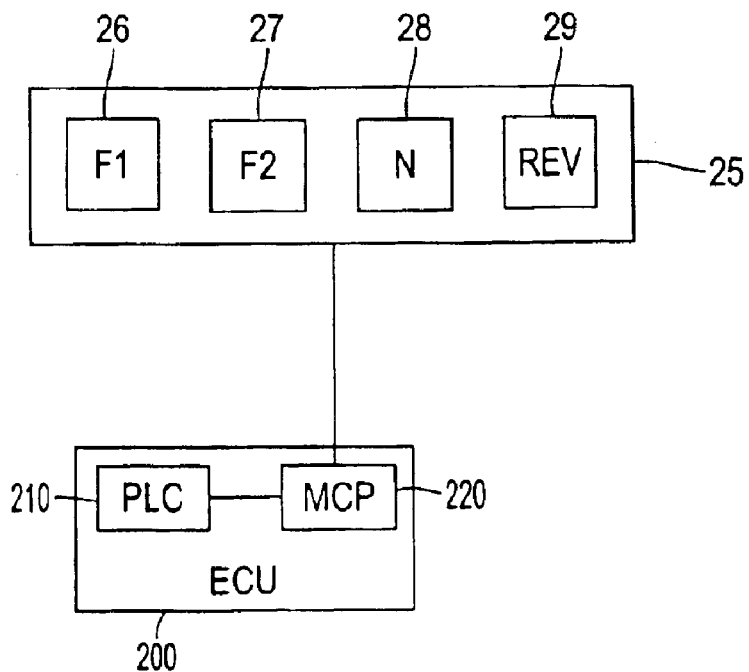
FIG. 6 is a diagram illustrating an exemplary embodiment of a driver's input control panel.

Referring to FIG. 6, a control panel 25 positioned, for example, in the operator area of the vehicle 10, includes a plurality of switches 26–29. After starting the vehicle 10 by moving the master switch 20 to the engine run position, one of the switches 26–29 is selected to establish a driving mode of the vehicle 10. A first driving mode F1 is established by selecting switch 26. The first driving mode F1 is established for driving the vehicle at lower speeds under conditions in which the vehicle 10 will start and stop frequently. A second driving mode F2 is established by selecting switch 27. The second driving mode F2 is established for driving the vehicle at higher speeds and under conditions in which the vehicle is started and stopped less frequently. The ECU 200 controls the electric motors 50 and 60 depending on which driving mode is established. The maximum power output and rpm of the electric motors 50 and 60 in the second driving mode F2 are higher than the maximum power output and rpm of the motors 50 and 60 in the first driving mode F1.

While two driving modes are shown, any number of modes can be used, depending on the driving conditions, road conditions, weather conditions, and the like.

The control panel 25 also includes a switch 28 to establish a neutral mode N. In the neutral mode N, the electric motors 50 and 60 are disengaged by the ECU 200. A reverse mode R is established by selecting a switch 29. In the reverse mode R, the electric motors 50 and 60 are controlled to rotate in the opposite direction of the first and second driving modes F1 and F2.

Figure 7:
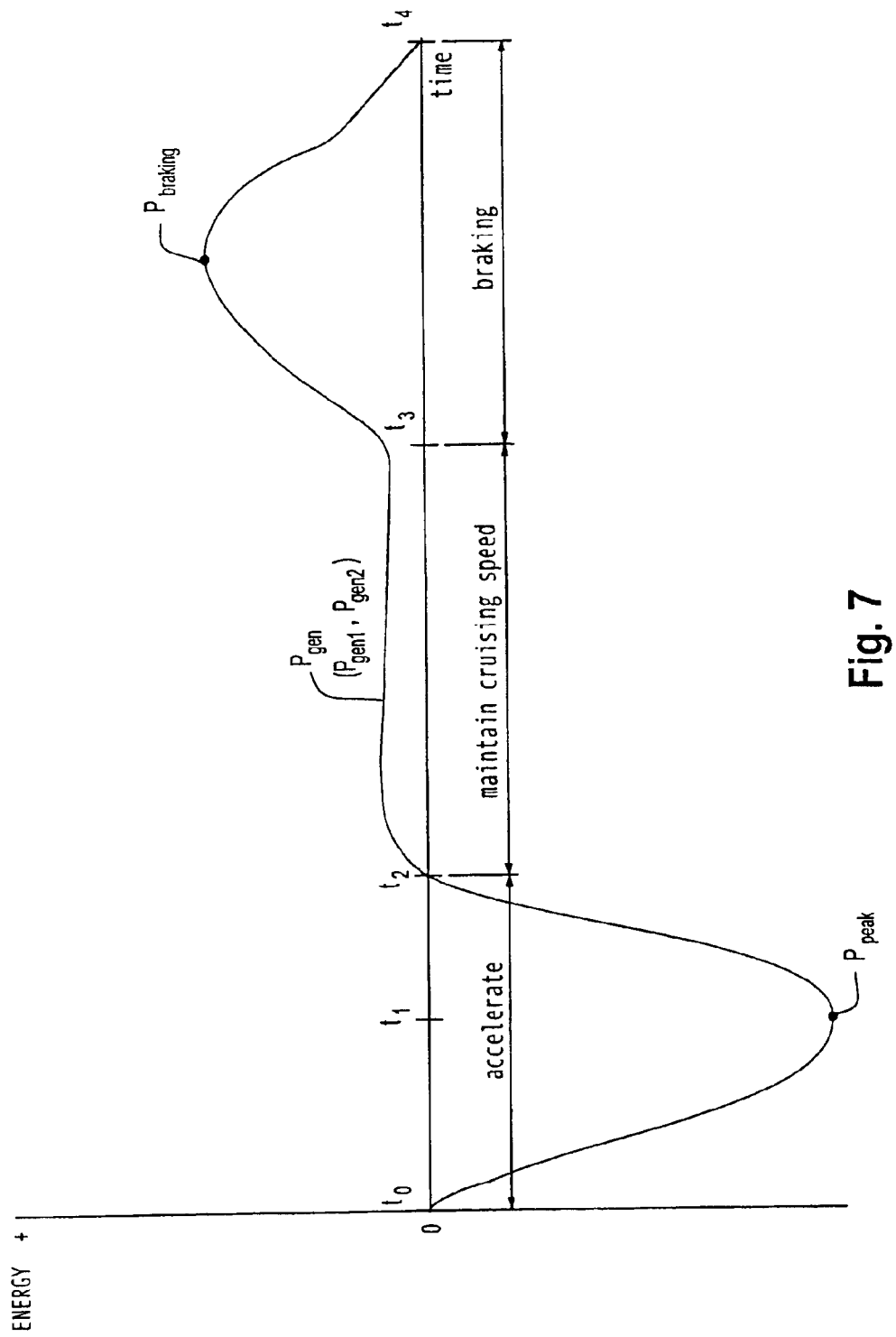
FIG. 7 is a diagram illustrating the relationship between the power created, the power stored, and the power consumed by the series hybrid electric vehicle.
Figure 8:
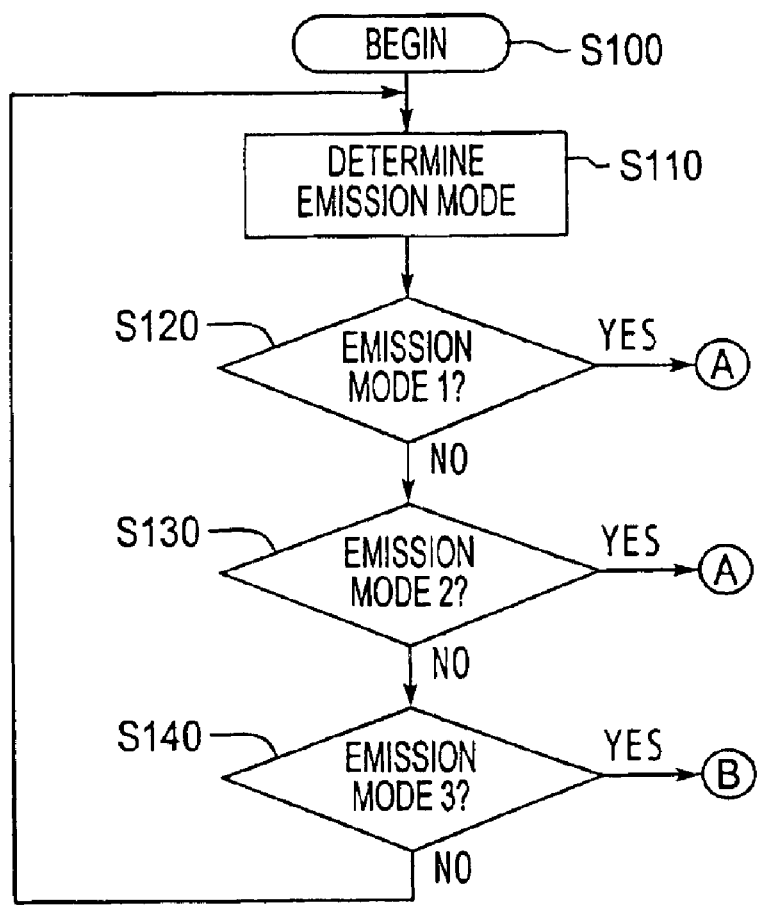
FIGS. 8–11 are flowcharts illustrating an exemplary control of the series hybrid electric vehicle.
Figure 9:
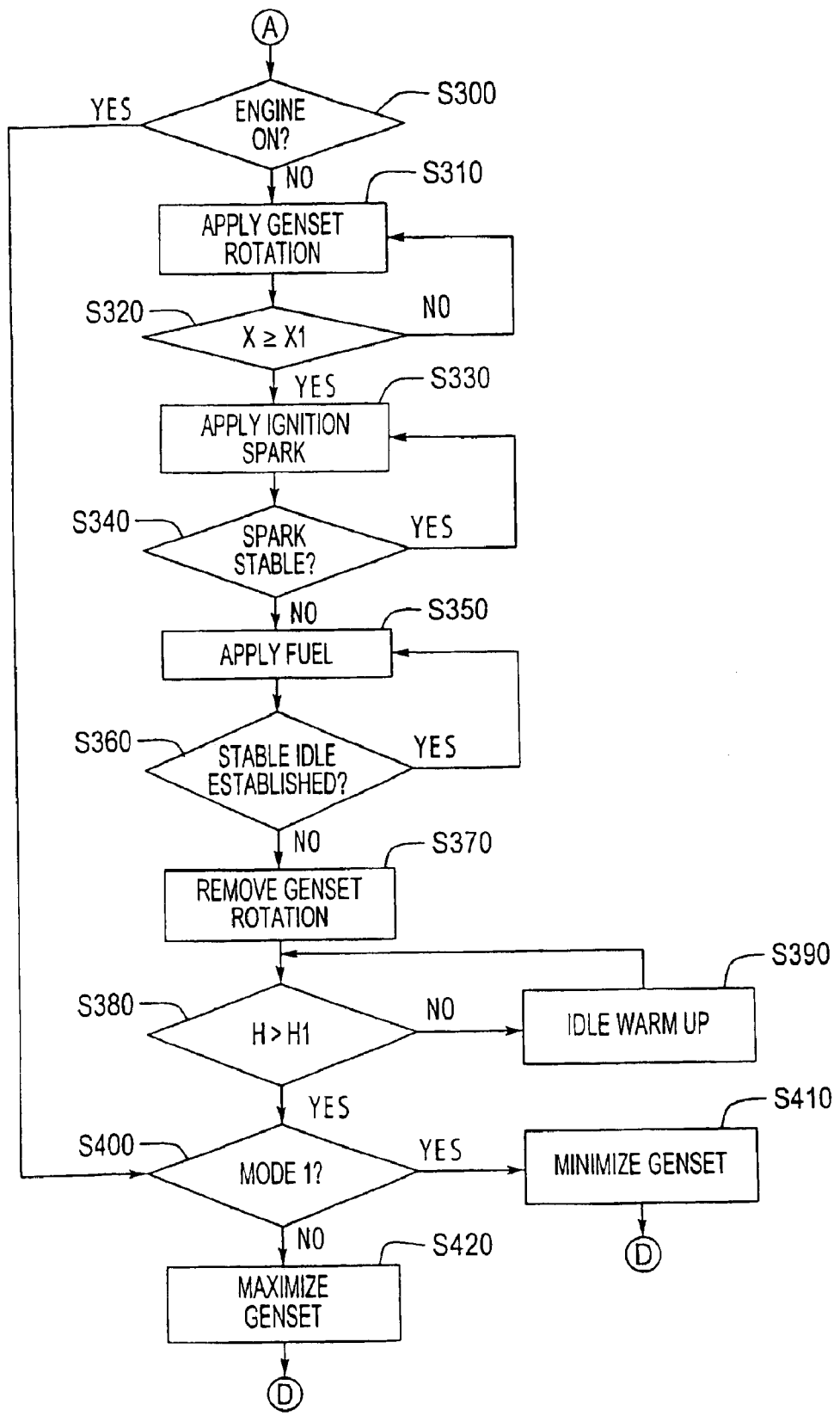

Referring to FIG. 7, the relationship between the power generated, the power stored, and the power consumed over time, by the series hybrid electric vehicle 10 according to the invention will be explained.

Power is consumed from the battery array 30 by the electric motors 50 and 60 during acceleration of the vehicle 10 to a cruising speed. As shown in FIG. 7, the vehicle 10 reaches cruising speed at time $t_1$ which corresponds to a peak power $P_{peak}$ of the electric motors 50 and 60. The peak power $P_{peak}$ of the electric motors 50 and 60 is dependent on the driving mode of the vehicle 10 selected by the operator. In the exemplary embodiment of the invention in which the electric motors 50 and 60 are each 220 Hp, the peak power $P_{peak}$ consumed by the electric motors 50 and 60 is 440 Hp.

The power consumption (traction effort) of the electric motors 50 and 60 during acceleration is represented by the curve below the horizontal axis and the area defined by the curve below the horizontal axis between the times $t_0$ and $t_2$ represents the total power consumption of the vehicle 10 during acceleration. In the event that the SOC of the battery array 30 is insufficient to achieve the cruising speed, the ECU 200 controls the motor controllers 51 and 61 to limit the peak power $P_{peak}$ the electric motors 50 and 60 may draw from the battery array 30. After the vehicle 10 has accelerated to cruising speed, the traction effort of the electric motors 50 and 60 may be reduced between the time $t_1$ and a time $t_2$, and the power consumption by the electric motors 50 and 60 may also be reduced.

The cruising speed of the vehicle 10 is maintained between the time $t_2$ and a time $t_3$. During the time between $t_2$ and $t_3$, the genset 300, 310 is operated to produce power $P_{gen}$ higher than the power consumption (traction effort) of the electric motors 50 and 60 necessary to maintain the vehicle's cruising speed. The differential in power between the traction effort and the power generated $P_{gen}$ is stored in the battery array 30.

The power $P_{gen}$ generated by the genset 300, 310 is dependent on the rpm of the engine 300 and a user demand signal sent to the genset 300, 310 that is controlled by the ECU 200. The ECU 200 controls the engine 300 to generally maintain the rpm of the engine 300, and the power generated $P_{gen}$, constant. However, it should be appreciated that the ECU 200 may control the engine 300 to reduce or increase the rpm of the engine 300, and thus the reduce or increase, respectively, the power generated $P_{gen}$.

The power generated $P_{gen}$ by the genset 300, 310 may be reduced if the SOC of the battery array 30 approaches an upper control limit at which the battery array 30 may become overcharged. The power generated $P_{gen}$ by the genset 300, 310 may be increased if the SOC of the battery array 30 approaches a lower control limit at which the battery array 30 would be unable to drive the electric motors 50 and 60 with enough torque to propel the vehicle 10. In an exemplary embodiment of the vehicle 10 in which the engine 300 is a 2.5 liter Ford LRG-425 engine powered by compressed natural gas, the power generated $P_{gen}$ is 70 Hp.

Regenerative braking occurs between the times $t_3$ and $t_4$ when the vehicle 10 decelerates after release of the accelerator pedal and when the vehicle 10 travels on a downhill slope at a constant speed. During regenerative braking, the electric motors 50 and 60 function as generators and current is supplied to the battery array 30 by the electric motors 50 and 60. The power generated $P_{braking}$ during regenerative braking is stored in the battery array 30.

The power generated by the genset 300, 310 during maintenance of the cruising speed and the power generated by regenerative braking $P_{braking}$ is represented by the curve above the horizontal axis and the area defined by the curve above the horizontal axis represents the total energy creation and storage of the vehicle 10 during maintenance of the cruising speed and regenerative braking.

The power $P_{gen}$ of the genset 300, 310 and the regenerative braking power $P_{braking}$ are controlled by the ECU 200 to substantially equal the energy consumption (traction effort) of the electric motors 50 and 60 during acceleration. In other words, the area defined by the curve below the horizontal axis is equal to the area defined by the curve above the horizontal axis. The ECU 200 controls the traction effort of the electric motors 50 and 60 (including the peak power $P_{peak}$) and the power generated $P_{gen}$ so that the power generated and the power stored do not exceed the power consumed, and vice versa, so as to maintain the SOC of the battery array 30 within a range of control limits. The ECU 200 controls the power generated $P_{gen}$ and the traction effort of the electric motors 50 and 60 so that the ampere hours during energy consumption do not exceed the thermal capacity of the battery array during power creation and storage.

As discussed above, in certain operational modes, the genset 300, 310 operates to produce power higher than the power consumption of the electric motors 50 and 60. In various exemplary embodiments, the power output by the genset 300, 310 declines as the SOC of the battery array 30 approaches a high level SOC. The battery array 30 is not fully charged, but managed to a SOC level predetermined to maximize the battery life and to accommodate the power requirements of the electric motors 50 and 60. Thus, it should be appreciated that the battery array 30 can be maintained at any SOC level less than the maximum SOC level. By keeping the battery array 30 at less than the maximum SOC, the battery array 30 is less likely to experience thermal runaway due to overcharging.

Furthermore, the MCP 220 can determine the SOC of the battery array 30 over a period of time to determine if there are any trends in the SOC level. The trend can be an overall reduction, increase, or maintaining of the SOC of the battery array 30 over a predetermined period of time. The MCP 220 can determine an accurate trend because the required energy by the genset 300, 310 does not vary greatly since the genset 300, 310 does not directly drive the vehicle 10. The MCP 220 can thus readily determine the trend, and the PLC 210 can adjust the energy requirement of the genset 300, 310 accordingly.

The vehicle 10, in this exemplary embodiment, has three modes of operation, a zero emissions mode 3 (i.e., a first mode), a limited emissions mode 2 (i.e., a third mode), and a full emissions mode 1 (i.e., a second mode). It should be appreciated that more than three emission modes can be provided, depending, perhaps, on the different environments in which a particular vehicle 10 will be used.

Zero emission mode 3 refers to the mode of operation of the vehicle 10 in which there are substantially no atmospheric, noise, thermal, or other discharges. It may be desirable for vehicle 10 to operate in the zero emission mode when it is in or adjacent a building or other area with limited air flow or in an area where exhaust gases cause a public health concern.

For example, one type of environment in which the vehicle 10 may be operated is in a closed route or circuit such as at an airport or a confined shopping area where the vehicle 10 travels the same circuit continuously. At certain locations in the circuit, it may be desirable for the vehicle 10 to emit zero emissions. For example, at an airport, it is desirable that the vehicle emit zero emissions when it is in or immediately adjacent a terminal, a rental car facility, a parking garage, etc., i.e., any time the vehicle 10 is in or adjacent a facility with limited air flow or circulation.

These zero emission environments may not be limited to buildings. It may be desirable for the vehicle 10 to operate at zero emissions even when the vehicle is in an open-air environment if public health is a concern, for example, next to a hospital or other medical facility, in an area where vehicle emissions are of a great concern, etc.

Vehicle 10 may, of course, be operated in any environment, and its course may vary, i.e., the vehicle 10 may be operated over open roads, without being restricted to a particular circuit or route.

The intermediate emission mode 2 refers to the mode of operation of the vehicle 10 in which certain or all discharges are restricted or limited. The genset 300, 310 does not run at a full operational level in the intermediate emission mode 2. One type of environment in which the vehicle 10 may be operated in the intermediate emission mode 2 may be an area bordering a zero emission zone. Also there may be certain environments where certain emissions are prohibited or limited, e.g., a limit on the amount of exhaust gases which are allowed in a particular area for public health reasons, while other discharges (e.g., noise) are not restricted.

The full emission mode 1 refers to the mode of operation of the vehicle 10 in which the operation of the vehicle 10 is not restricted by any emissions limitations or restrictions. Thus, the genset 300, 310 can operate at the full operational level without restriction.

An exemplary embodiment for controlling the series type hybrid electric vehicle 10 will be explained with reference to FIGS. 8–11. The control method shown in FIGS. 8–11 may be automatically executed at predetermined times or locations during operation of the vehicle 10, or executed manually.

The control method begins at step S100 and proceeds to step S10 where the MCP 220 determines the emission mode in which vehicle 10 should be operating.

The emission mode in which the vehicle 10 should be operating may be automatically determined by sensors on the vehicle 10, e.g., a GPS, radio, mechanical trip, mileage counter, etc. mounted on the vehicle 10 which may interact with transmitters along the route traversed by the vehicle 10. It should be appreciated that any automatic means currently available or later developed can be used for the vehicle 10 to determine the location of the vehicle 10, and thus determine what emission mode the vehicle 10 should be in. Also, a visible (e.g., a sign) or an audible signal mechanism could signal to the driver as to the mode the vehicle 10 should be operating in, and the driver could supply this information to the MCP 220.

The control method then proceeds to step S120 where it is determined if the vehicle is in emission mode 1. If the vehicle is in emission mode 1 (S120:Yes), the control method proceeds to step S300 (see FIG. 9). If the vehicle is not in emission mode 1 (S120:No), the control method proceeds to step S130 where it is determined if the vehicle 10 is in emission mode 2. If the vehicle is in emission mode 2 (S130:Yes), the control method also proceeds to step S300.

If the MCP 220 determines that the vehicle 10 is not in emission mode 2 (S130:No), the control method proceeds to step 140 where it is determined if the vehicle is in emission mode 3. If the vehicle 10 is not in emission mode 3 (S140:No), the control method returns to step S110 where the MCP 220 again determines what emission mode the vehicle 10 is in. If the vehicle 10 is in emission mode 3 (S140:Yes), the control method proceeds to step S500, which is discussed below.

When the control method proceeds to step S300 (see FIG. 9), the MCP 220 has determined that the vehicle 10 should be operating in either emission mode 1 or emission mode 2. The MCP 220 receives input from a sensor indicating if the internal combustion engine 300 is on. If the internal combustion 300 is on (S330:Yes), the method proceeds to step S400. If the internal combustion engine 300 is off (S300:No), the control method proceeds to step S310 where the PLC 210 instructs the generator 310 to operate as a motor for starting the internal combustion engine 300. The PLC 210 also activates an oil pump to increase the oil pressure in the internal combustion engine 300 before it is started by generator 310. In various exemplary embodiments, the pump is an auxiliary oil pump attached to the generator 310. Thus, as the PLC 210 turns on the genset 300, 310, the generator 310 also turns on the oil pump. In various exemplary embodiments, when the internal combustion engine 300 is a large engine, an additional pump can also be provided to pump oil into the internal combustion engine 300. In this exemplary embodiment, the additional electrical pump can be a separate pump, which is not attached to the internal combustion engine.

The control method then proceeds to step S320 where the MCP 220 receives input from a sensor indicating the oil pressure X within the internal combustion engine 300. The MCP 220 determines if the oil pressure X is equal to or greater than a predetermined oil pressure X1. The predetermined oil pressure X1 is the oil pressure which assures that oil is adequately supplied to the internal combustion engine 300. In various exemplary embodiments, if the internal combustion engine 300 is a 2.5 liter Ford LRG-425 engine, the predetermined oil pressure could be approximately 40 psi. However, it should be appreciated that other oil pressures may be acceptable, depending on the types of engine and the operating conditions of the engines.

If the MCP 220 determines that the oil pressure X is less than the predetermined oil pressure X1 (S320:No), the control method returns to step S310. If the oil pressure is equal to or greater than the predetermined oil pressure X1, the control method proceeds to step S330 where the PLC 220 instructs the internal combustion engine 300 to start applying an ignition spark. The control method then proceeds to step S340 where the MCP 220 receives input from a sensor indicating whether the spark has been stabilized. If the spark has not been stabilized (S340:No), the control method returns to step S330 where the ignition spark is applied again.

If, however, the MCP 220 determines that a stable spark has been achieved, (S340:Yes), the control method proceeds to step S350 where fuel is supplied to the internal combustion engine 300.

The control method then proceeds to step S360 where the MCP 220 receives input from a sensor indicating if the engine 300 has achieved a stable idle. A stable idle ignition has been achieved when the MCP 220 determines that the internal combustion engine 300 is able to operate without the use of the generator 310 as a motor. This is normally determined by comparing the rotation of the internal combustion engine 300 with a predetermined rotation, with the predetermined rotation being a rotation at which the engine 300 can sustain operation.

If the rotation of the internal combustion engine 300 is not above the predetermined rotation at step 360 (S360:No), the control method returns to step S350 where more fuel is supplied to the internal combustion engine 300. If, however, the internal combustion engine 300 is above a predetermined rotation (S360:Yes), the control method proceeds to step S370 and the PLC 210 instructs the generator 310 to stop operating as a motor for starting the internal combustion engine 300. At this point, the internal combustion engine 300 is able to operate (rotate) without the assistance of the generator 310.

As should be appreciated, this control method and apparatus avoids the application of a large mechanical load to the internal combustion engine 300 upon starting, because a sufficient oil pressure is attained before the spark and fuel are supplied. The oil pressure reduces the mechanical load as a sufficient amount of oil creates a smooth transition in restarting the rotation of the internal combustion engine 300. Thus, the restarting of the genset 300, 310 only has to withstand a relatively low load from the starting of the generator 310 and not a large load from the starting of the internal combustion engine 300.

After the generator 310 ceases functioning as a starter motor in step S370, the control method proceeds to step S380 where the MCP 220 receives input from a sensor to determine if the temperature H of the genset 300, 310 is equal to or above a predetermined temperature H1. The predetermined temperature H1 is the desired thermal level for operating the genset 300, 310 at full output.

If the temperature H is less than the predetermined temperature H1 (S380:No), the control method proceeds to step S390 where the PLC 210 instructs the genset 300, 310 to move to an idle warm up phase.

As should be appreciated, the generator 310 usually reaches an appropriate thermal level to sustain full output faster than the internal combustion engine 300. If the generator reaches an appropriate thermal level before the internal combustion engine 300, the PLC 210 stops the idle-warm up phase for the generator 310 and the generator remains idle, while the engine 200 is still being heated, until the MCP 220 receives input from a sensor associated with the internal combustion engine 300 to indicate that the internal combustion engine has reached an appropriate thermal level to sustain full output. However, in various exemplary embodiments, the PLC 210 can increase the rate to thermally warm the internal combustion engine 300, as determined by the MCP 220 based on data from sensors, so that both the internal combustion engine 300 and generator 310 reach the appropriate thermal level at substantially the same time. In the alternative, the PLC 210 can decrease the rate at which the generator 310 is being heated, based on data from sensors, so that both the internal combustion engine 300 and generator 310 reach the appropriate thermal level at substantially the same time.

Once the temperature of the genset 300, 310 is equal to or greater than the predetermined temperature H1 (S380:Yes) the control method proceeds to step S400 where the MCP 220, as described above, has automatically determined the emission mode in which the vehicle 10 should be operating.

If the vehicle 10 should be in emission mode 1 (S400:Yes), the control method proceeds to step S420 where the power output by the genset 300, 310 can be maximized. The power output by the genset 300, 310 can be maximized as the $P_{gen}$ by the generator 310 can be increased to the current rotation of the internal combustion engine 300 and the rotational speed of the internal combustion engine 300 can be increased to its maximum rotation. However, if the battery array 300 is already charged to the desired SOC, the genset 300, 310 could go to a normal operation or any other operation to maintain a predetermined SOC of the battery array 30. It should be appreciated that it could be desirable for the genset 300, 310 to be operating at full maximum power output when the SOC of the battery array 30 is at a low SOC, if a high power output is required to operate the auxiliary systems of the vehicle, if different routes and/or different times of day vary the average power demands for the battery array 30, or any other situation that would require a rapid charging of the battery array 30.

If the MCP 220 determines that the vehicle 10 is in emission mode 2 (S400:No), the control method proceeds to step S410 where the power output by the genset 300, 310 is minimized. The power output of the genset 300, 310 is minimized based on the emission limitations of the environment in which the vehicle 10 is operating. Thus, the genset 300, 310 can operate to produce power less than the maximum output, but higher than the power consumption of the electric motors 50 and 60, at the same level as the power consumption of the electric motors 50 and 60, or below the power consumption of the electric motors 50 and 60 to reduce the drain on the electrical charge of the battery array 30 to a lower control limit. While a single intermediate mode has been explained, it should be appreciated that the intermediate mode can have several sub-levels, meeting various emission limitations or restrictions. Thus, the allowable power output by the genset 300, 310 may vary based on the environment in which vehicle 10 is operating, and may vary at many different levels.

In various exemplary embodiments, when the internal combustion engine 300 is turned on in step S410 and step S420, the PLC 210 gradually increases the rotational speed of the internal combustion engine 300. The PLC 210 gradually increases the rotational speed, rather than immediately starting the normal operation of the internal combustion engine 300, to further lessen the engine load when starting the internal combustion engine 300.

After vehicle 10 is fully operational in modes 2 or 3, i.e., the vehicle 10 is operating in its normal mode, as discussed above, the control method proceeds to step S200 (see FIG.

11). In step S200, the MCP again receives input from a sensor which measures the energy output E of genset 300, 310, and compares E to a predetermined energy level E1.

If the energy level E is above a predetermined energy level E1 (S200:Yes), control method proceeds to step S210 where the PLC 210 either reduces the rotation of the internal combustion engine 300, changes the position of the throttle valve of the internal combustion engine 300 to reduce the fuel to engine 300, and/or applies a retarder to slow down the power output of the internal combustion engine 300.

The control method then proceeds to step S220 where the PLC 210 instructs the genset 300, 310 to operate as indicated in step S210 to burn off the excess energy through the internal combustion engine 300. Thus, excess energy is burned off to reduce the energy level E.

The control method then proceeds to step S230 where the MCP 220 receives input from a sensor to determine if the energy level E is less than the predetermined energy level E1. If the energy level is greater than or equal to the predetermined energy level E1 (S230:Yes), the control method returns to step S210. If the energy level E is less than or equal to the predetermined energy level E1 (S230:No), the control method proceeds to step S250 where the control method ends.

Figure 10:
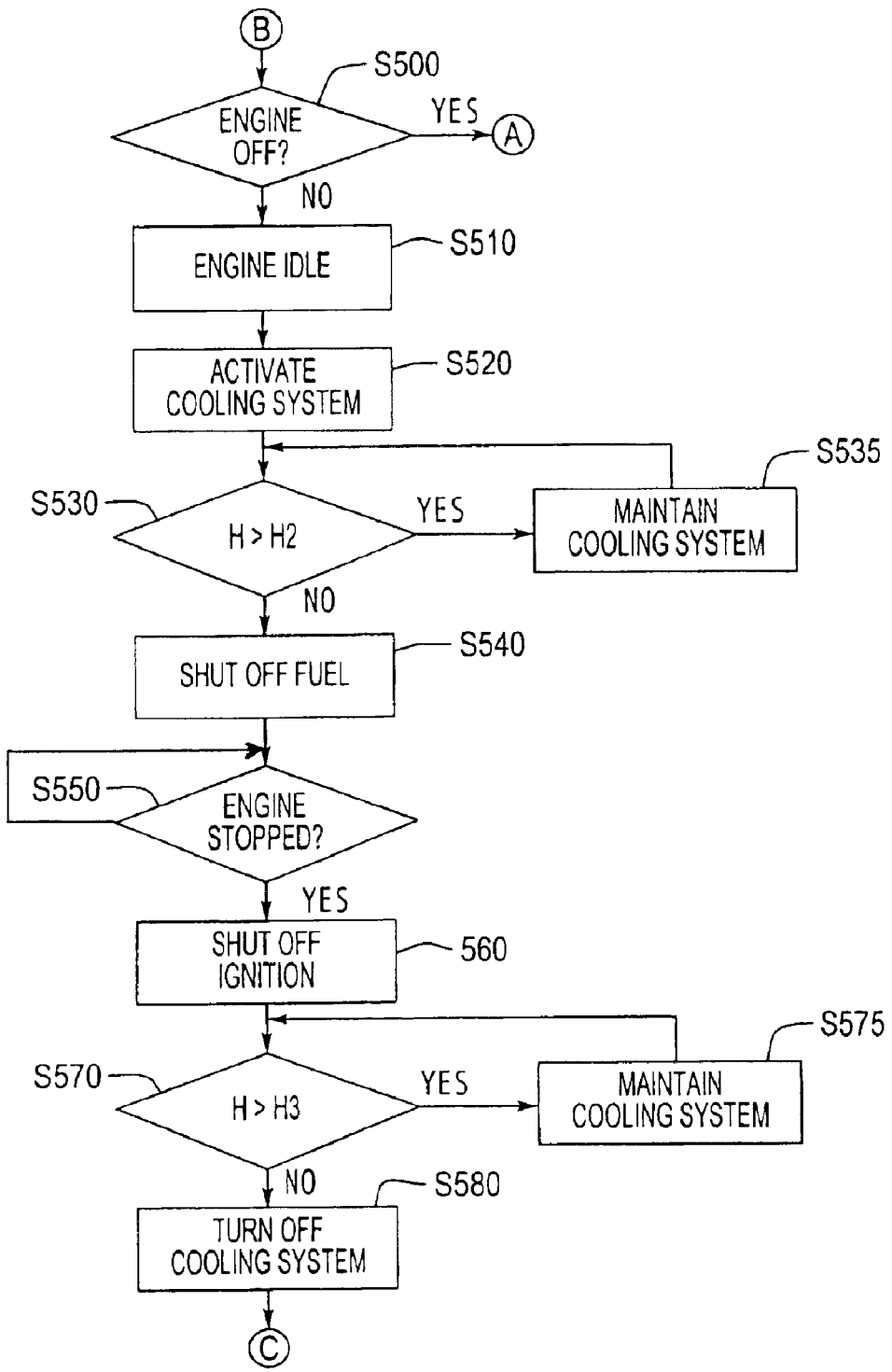
Figure 11:
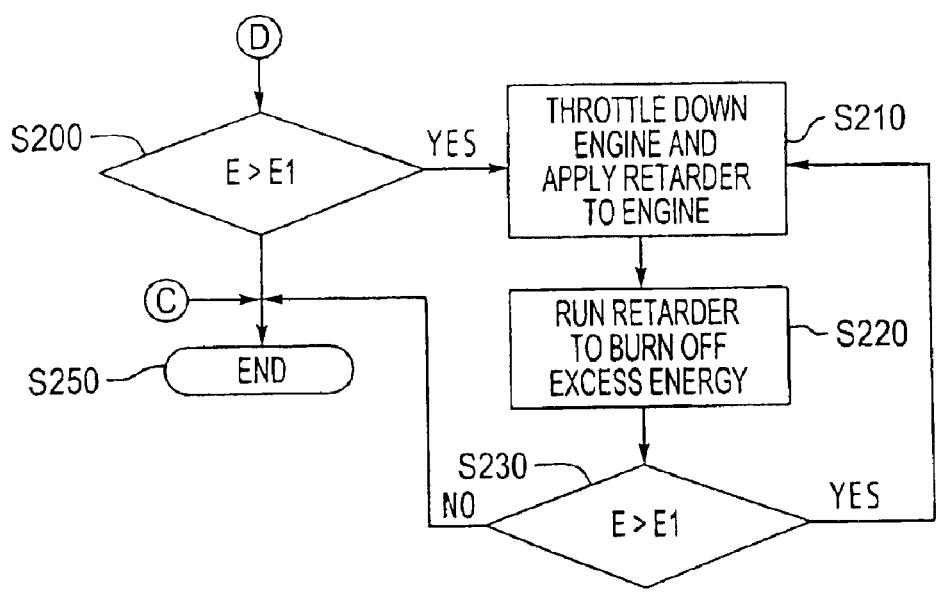

As stated above, when vehicle 10 is in emission mode 3 (S140:Yes), the control method goes to step S500 (see FIG. 10). In step S500, the MCP 220 receives input from a sensor to determine if the internal combustion engine 300 is on. If the internal combustion engine is off (S500:Yes), the control method proceeds to step S250, where the control method ends.

If the MCP 220 determines that the engine is on (S500:No), the control method proceeds to step S510 where the PLC 210 switches the internal combustion engine 300 from a power generation mode to an engine idle mode. Thus, the internal combustion engine 300 stops driving the generator 310.

The control method then proceeds to step S520 where the PLC 210 activates the cooling system to thermally cool the internal combustion engine 300. The control method then proceeds to step S530 where the temperature H of the internal combustion engine 300 is compared to a predetermined temperature H2. The predetermined temperature H2 is a predetermined temperature used to prevent thermal shock and a heat soak effect before turning off the internal combustion engine 300. The heat soak effect occurs when particular sections of the internal combustion engine 300 are warmer than other sections, with the warmer sections thus warming the entire internal combustion engine. By uniformly cooling the internal combustion engine 300, the structural integrity of the engine can be maintained because the engine is able to adequately cool to a predetermined temperature H2.

If the temperature H of the internal combustion engine 300 is greater than the predetermined temperature H2 (S530:Yes), the control method proceeds to step 535 where the cooling system remains on until the temperature H of the internal combustion engine 300 is less than the predetermined temperature H2.

If the temperature H is less than or equal to the predetermined temperature H2, the control method proceeds to step S540 where the PLC 210 shuts off the fuel supplied to the internal combustion engine 300. The internal combustion engine 300 remains on after the fuel is shutoff from the internal combustion engine 300 because the remaining fuel and fuel vapors within the internal combustion engine 300 is burned off. Thus, the fuel within the fuel lines and manifolds is removed to prevent backfires and so that unburnt fuel and emissions are emitted.

The control method then proceeds to step S550 where the MCP 220 receives an input from a sensor to determine if the internal combustion engine 300 has stopped. As should be appreciated, the internal combustion engine 300 stops after the fuel and fuel vapors within the internal combustion 300 are burned off. If the MCP 220 determines that the internal combustion engine 300 has stopped (S550:Yes), the control method proceeds to step S560 where the PLC 210 turns off the ignition spark of the internal combustion engine 300.

The control method then proceeds to step S570, where the temperature H of the internal combustion engine, as determined by a sensor, is compared to a predetermined temperature H3. The predetermined temperature H3 is lower than the predetermined temperature H2 and is used to uniformly cool the vehicle 10. The predetermined temperature H3 is also used to prevent heat from releasing to the atmosphere and to prevent the heat soak after the internal combustion engine 300 has been turned off.

If the temperature H of the internal combustion engine 300 is more than the predetermined temperature H3 (S270:Yes), the control method proceeds to step S575 where the cooling systems remain on.

When the MCP 220 receives input from the sensors indicating that the temperature H of the internal combustion engine 300 is less than or equal to the predetermined temperature H3, (S570:No), the control method then proceeds to step S580 where the PLC 210 turns off the cooling systems. The control method then proceeds to step S250 where the control method ends.

In various exemplary embodiments, the MCP 220 can increase the rotation of the internal combustion engine 300 to increase the thermal output of the internal combustion engine 300. The increased thermal output can be used to increase the temperature within the cabin of the vehicle 10. Thus, the increased thermal output of the internal combustion engine 300 can be used to warm the cabin of the vehicle 10 during cold days or any other time where it is desired to increase the temperature of the cabin of the vehicle 10. As should be appreciated, the internal combustion engine 300 can increase the rotation without increasing the power generated as the IGBT 330 controls the conversion of AC voltage to DC voltage from the generator 310 as described above.

In various exemplary embodiments, the vehicle 10 can also use more than one genset 300, 310. The additional genset 300, 310 can be used to generate additional energy or thermal output based on the size of the bus, the number of passengers on the bus, different routes used by the vehicle 10, different energy requirements based on the time of day, or any other situation which result in a high energy or thermal output, and thus a high variable genset 300, 310 output. The additional genset 300, 310 could be used only when the first genset 300, 310 is not able to maintain the charge of the battery array 30 or thermal output. The additional genset 300, 310 can also be used equally with the first genset 300, 310. Furthermore, the first or additional genset 300, 310 can be smaller and thus have a smaller output than the other genset 300, 310. However, it should be appreciated that any other use of the additional genset 300, 310 can be used to supplement the first genset 300, 310.

While the invention has been described with reference to various exemplary embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

In addition, this invention covers apparatus and methods to control the vehicle through various emission modes. Moreover, this invention also covers circumstances where a transition period is used before entering the zero emission mode. Thus the transition period for turning off the internal combustion engine can be used before entering the zero emission zone to prevents emission from entering the zero emission zone. Also, as stated, the subject apparatus and method can be utilized by manual activation, as opposed to the use of automatic switch mechanisms.

What is claimed is:

1. A method for adaptively controlling a hybrid electric vehicle including an energy generation system, an energy storage system receiving energy at least from the energy generation system, and at least one electric motor receiving energy from the energy storage system with the energy generation system selectively operated in various operation modes, comprising:

operating the energy generation system in a first mode in which the energy generation system is off and the motor propels the vehicle from power stored in the energy storage system;

operating the energy generation system in a second mode in which the energy generation system is operating without restriction as to limiting vehicle discharges; and operating the energy generation system in a third mode in which the operation of the energy generation system is at least partially restricted to limit vehicle discharges.

2. The method of claim 1, further comprising:
   operating the energy generation system in the first mode when the vehicle is driven in a zone where substantially zero emissions are allowed.

3. The method of claim 1, further comprising:
   operating the energy generation system in the second mode when the vehicle is driven in a zone with substantially no emission restrictions.

4. The method of claim 1, further comprising:
   operating the energy generation system in a third mode when the vehicle is driven in a zone with emission restrictions.

5. The method of claim 1, further comprising:
   monitoring an operator input to determine the operating mode used.

6. The method of claim 1, further comprising:
   monitoring an external signal to determine the operating mode used.

7. The method of claim 1, further comprising:
   monitoring component states to determine if a fault state is present, and determining the operating mode used based upon the status.

8. The method of claim 1, further comprising:
   determining if the energy generation system has exceeded a predetermined energy level while operating in the second and third modes; and
   lowering an energy level of the energy generation system if the predetermined energy level has been exceeded.

9. A hybrid electric vehicle, comprising:
   an energy generation system;
   an energy storage system receiving energy at least from the generation system;
   at least one electric motor receiving energy from the energy storage system; and
   a controller that selectively operates the energy generation system in various operation modes, including:
      a first mode in which the energy generation system is off and the motor propels the vehicle from power stored in the energy storage system;
      a second mode in which the energy generation system is operating without restriction as to limiting vehicle discharges; and
      a third mode in which the operation of the energy generation system is at least partially restricted to limit vehicle discharges.

10. The vehicle of claim 9, wherein the controller:
    operates the vehicle in the first mode when the vehicle is driven in a zone where substantially zero emissions are allowed.

11. The vehicle of claim 9, wherein the controller:
    operates the vehicle in the second mode when the vehicle is driven in a zone with substantially no emission restrictions.

12. The vehicle of claim 9, wherein the controller:
    operates the vehicle in a third mode when the vehicle is driven in a zone with emission restrictions.

13. The vehicle of claim 9, wherein the controller:
    monitors an operator input to determine the operating mode used.

14. The vehicle of claim 9, wherein the controller:
    monitors an external signal to determine the operating mode used.

15. The vehicle of claim 9, wherein the controller:
    monitors component states to determine if a fault state is present, and determining the operating mode used based upon the status.

16. The vehicle of claim 9, wherein the controller:
    determines if the energy generation system has exceeded a predetermined energy level while operating in the second and third modes; and
    lowers an energy level of the energy generation system if the predetermined energy level has been exceeded.

17. A method for adaptively controlling a hybrid electric vehicle including an emission creating energy generation system, an energy storage system receiving energy at least from the energy generation system, and at least one electric motor propelling the vehicle through a zone of reduced emissions, comprising:
    determining the zone of reduced emissions;
    turning off the energy generation system before entering the zone;
    maintaining the energy generation system in an off mode while the vehicle is propelled in the zone by the motor; and
    turning on the energy generation system after the vehicle leaves the zone.

18. The method of claim 17, wherein the zone is a substantially zero emission zone.

19. The method of claim 17, wherein emission gases are prevented from entering the zone.

20. The method of claim 17, further comprising:
    determining the electrical charge of the energy storage system before entering the zone; and charging the energy storage system to a predetermined electrical level before entering the zone if the electrical charge is below the predetermined electrical level.

21. The method of claim 20, further comprising:

raising the rate for charging the energy storage system to reach the predetermined electrical level.

22. The method of claim 21, further comprising:

performing a global power shed by reducing ancillary systems of the vehicle to increase the rate for charging.

23. The method of claim 1, further comprising:

lowering the operating temperature of the energy generation system to a predetermined temperature before the vehicle enters the zone.

24. The method of claim 17, wherein the vehicle responds to sensors to automatically change an operation mode of the vehicle.

25. The method of claim 17, wherein the vehicle responds to manual switches to manually change an operation mode of the vehicle.

26. A hybrid electric vehicle, comprising:

an emission creating energy generation system;

an energy storage system that receives energy at least from the energy generation system;

a least one electric motor receiving power from the energy storage system, the motor propelling the vehicle; and a controller that:
  determines a zone of reduced emissions;
  turns off the energy generation system before entering the zone;
  maintains the energy generation system in an off mode while the vehicle is propelled in the zone by the motor; and
  turns on the energy generation system after the vehicle leaves the zone.

27. The vehicle of claim 26, wherein the zone is a substantially zero emission zone.

28. The vehicle of claim 26, wherein emission gases are prevented from entering the zone.

29. The vehicle of claim 26, wherein the controller:

determines a state of charge of the energy storage system before entering the zone; and activates the energy generation system to charge the energy storage system to a predetermined level before entering the zone if the state of charge is below the predetermined level.

30. The vehicle of claim 29, wherein the controller:

increases the rate for charging to reach the predetermined level before entering the zone of reduced emissions.

31. The vehicle of claim 30, wherein the controller:

performs a global power shed by reducing ancillary systems of the vehicle to increase the rate for charging.

32. The vehicle of claim 26, wherein the controller responds to sensors to automatically change an operation mode of the vehicle.

33. The vehicle of claim 26, wherein the vehicle responds to manual switches to manually change an operation mode of the vehicle.

34. A hybrid electric vehicle, comprising:

an emissions creating energy generation system connected to a generator;

an electrical energy storage system receiving current at least from the generator;

a least one electric motor receiving current from the electrical energy storage system, the motor propelling the vehicle; and a controller that controls the vehicle according to the following modes:
  a normal mode where the energy generation system and generator operate to produce power higher than a power consumption of the motor;
  a first transition mode, after the controller determines a zone of reduced emissions, for determining an electrical charge of the energy storage system before entering the zone, activating the generator to charge the energy storage system to a predetermined electrical level before entering the zone if the electrical charge is below the predetermined level, and turning off the energy generation system and the generator before entering the zone; and
  a reduced emission mode after the first transition mode for maintaining the energy generation system and the generator in the off mode while the vehicle is propelled in the zone by the motor.

* * * * *